(12) United States Patent
Peng et al.

(10) Patent No.: US 9,575,368 B2
(45) Date of Patent: Feb. 21, 2017

(54) LIQUID CRYSTAL DISPLAY PANEL AND METHOD FOR MANUFACTURING THE SAME

(71) Applicant: Century Technology (Shenzhen) Corporation Limited, Shenzhen (CN)

(72) Inventors: Hai-Bo Peng, Shenzhen (CN); Chen-Fu Mai, New Taipei (TW); Yang Chen, Shenzhen (CN)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 8 days.

(21) Appl. No.: 14/819,898

(22) Filed: Aug. 6, 2015

(65) Prior Publication Data

US 2016/0291413 A1    Oct. 6, 2016

(30) Foreign Application Priority Data

Mar. 31, 2015   (CN) .......................... 2015 1 0147099

(51) Int. Cl.
| | | |
|---|---|---|
| *H01J 9/00* | (2006.01) | |
| *H01J 9/24* | (2006.01) | |
| *G02F 1/1337* | (2006.01) | |
| *G02F 1/1341* | (2006.01) | |
| *G02F 1/1343* | (2006.01) | |

(52) U.S. Cl.
CPC ....... *G02F 1/133788* (2013.01); *G02F 1/1341* (2013.01); *G02F 1/13439* (2013.01); *G02F 1/133784* (2013.01); *G02F 1/134309* (2013.01); *G02F 2001/134345* (2013.01)

(58) Field of Classification Search
CPC .............. G02F 1/133788; G02F 1/1341; G02F 1/134309; G02F 1/133784; G02F 1/13439; G02F 2001/134345
See application file for complete search history.

(56) References Cited

U.S. PATENT DOCUMENTS

| | | | | |
|---|---|---|---|---|
| 2007/0146599 A1* | 6/2007 | Uchida | ............. | G02F 1/133753 349/129 |
| 2012/0026439 A1* | 2/2012 | Jung | ................. | G02F 1/133753 349/110 |
| 2016/0266442 A1* | 9/2016 | Kuboki | ............. | G02F 1/133753 |

\* cited by examiner

*Primary Examiner* — Donald Raleigh
(74) *Attorney, Agent, or Firm* — Zhigang Ma

(57) ABSTRACT

A method for manufacturing a liquid crystal display (LCD) panel is disclosed. The LCD panel includes a first alignment layer formed on a first substrate and a second alignment layer formed on a second substrate. A liquid crystal layer having a plurality of liquid crystal molecules between the first alignment layer and the second alignment layer is exposed using a photomask from a side of the second substrate away from the first substrate. Thus, a portion of the liquid crystal molecules are arranged at a first pre-tilt angle and the other portion of the liquid crystal molecules are arranged at a second pre-tilt angle less than the first pre-tilt angle.

20 Claims, 14 Drawing Sheets

LIQUID CRYSTAL DISPLAY PANEL AND METHOD FOR MANUFACTURING THE SAME

CROSS-REFERENCE TO RELATED APPLICATIONS

This application claims priority to Chinese Patent Application No. 201510147099.2 filed on Mar. 31, 2015, the contents of which are incorporated by reference herein.

FIELD

The subject matter herein generally relates to a liquid crystal display (LCD) panel a method for manufacturing the display panel.

BACKGROUND

In-plane switching mode liquid crystal display (IPS-LCD) panels are becoming more and more popular because they can present a wider viewing angle to a viewer than twisted nematic (TN) mode LCD panels. Generally, an IPS-LCD panel includes two opposite substrates and a liquid crystal layer coupled between the two opposite substrates. Liquid crystal molecules in the liquid crystal layer are arranged along a predetermined orientation by an alignment layer in an initial state. When a voltage is applied to form an electric field within the liquid crystal layer, the liquid crystal molecules are twisted to realize a display function of the IPS-LCD.

BRIEF DESCRIPTION OF THE DRAWINGS

Implementations of the present technology will now be described, by way of example only, with reference to the attached figures.

DETAILED DESCRIPTION

Figure 1:
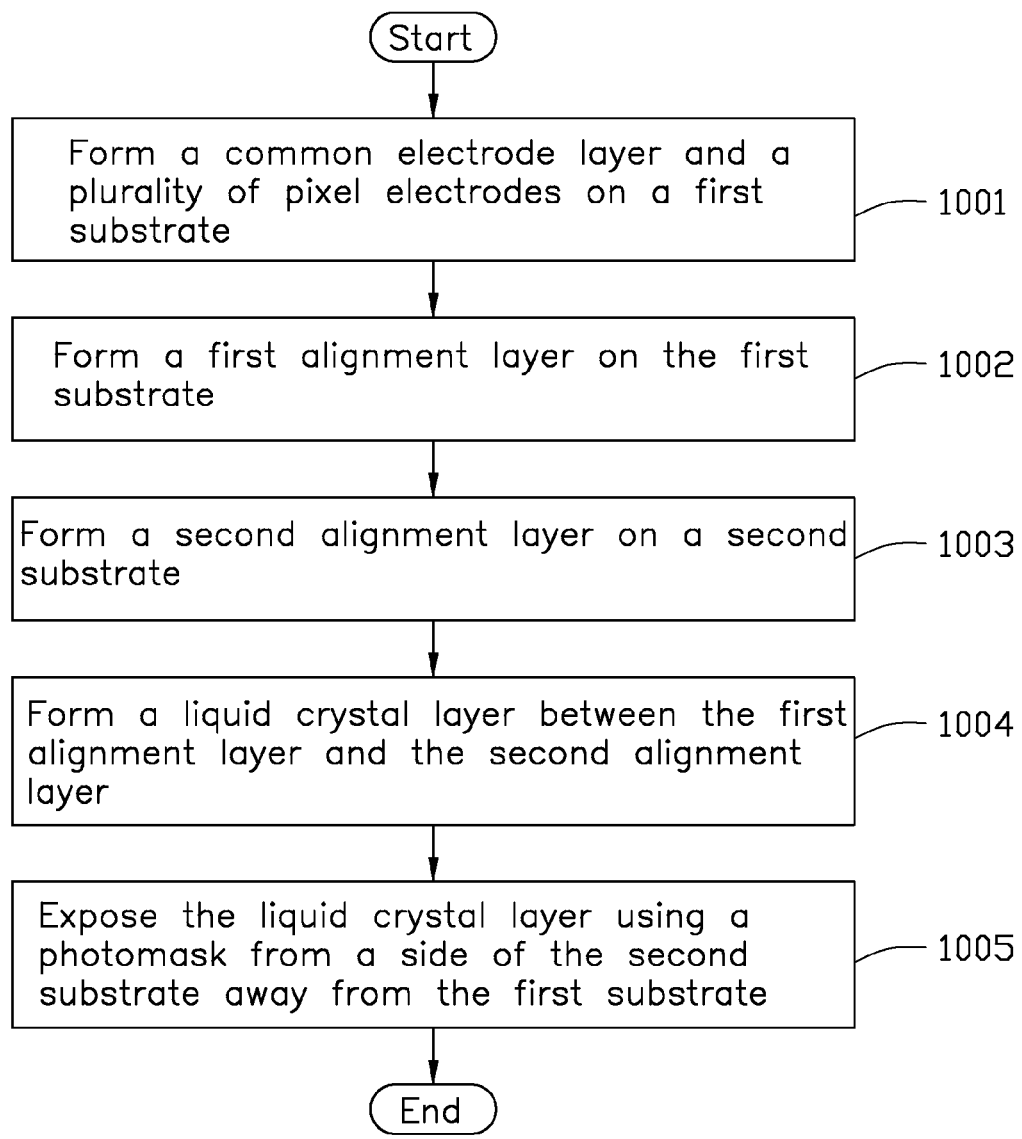
FIG. 1 illustrates a flowchart of a method for manufacturing a liquid crystal display (LCD) panel according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The connection can be such that the objects are permanently connected or releasably connected. The term "comprising", when utilized, means "including, but not necessarily limited to"; it specifically indicates open-ended inclusion or membership in the so-described combination, group, series and the like.

The present disclosure is described in relation to a liquid crystal display (LCD) panel and a method for manufacturing the same.

Generally, a traditional in-plane switching mode liquid crystal display (IPS-LCD) panel can include a plurality of pixel electrodes. Each pixel electrode may be composed of a plurality sub-pixel electrodes. Each two adjacent sub-pixel electrodes define a space therebetween. The two adjacent sub-pixel electrodes may generate an unwanted electric field at a position corresponding to the space. The unwanted electric field may cause the liquid crystal molecules to not be precisely arranged along a predetermined orientation by alignment layers of the IPS-LCD panel, thereby decreasing light transmission of the IPS-LCD panel.

FIG. 1 illustrates a flowchart of a method for manufacturing a LCD panel 10 according to a first embodiment. In at least one embodiment, the LCD panel 10 can be an IPS-LCD panel. The method is provided by way of example, as there are a variety of ways to carry out the method. Each block shown in FIG. 1 represents one or more processes, methods, or subroutines which are carried out in the example method. Furthermore, the order of blocks is illustrative only and the order of the blocks can change. Additional blocks can be added or fewer blocks may be utilized without departing from the scope of this disclosure. The example method can begin at block 1001.

Figure 2:
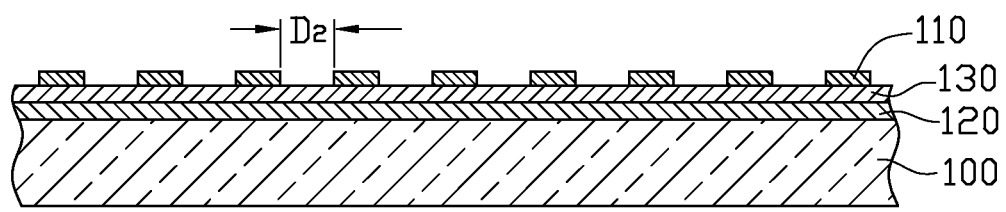
FIG. 2 illustrates a diagrammatic view of a common electrode layer and a plurality of pixel electrodes formed on a first substrate.

At block 1001, a common electrode layer 120 and a plurality of pixel electrodes 110 are respectively formed on a first substrate 100. In at least one embodiment, FIG. 2 illustrates that the common electrode layer 120 is insulated and is separated from the plurality of pixel electrodes 110 by an insulation layer 130. The common electrode layer 120 is formed on a surface of the first substrate 100. The insulation layer 130 is located between the common electrode layer 120 and the plurality of pixel electrodes 110. The plurality of pixel electrodes 110 can be formed at intervals on a surface of the insulation layer 130 away from the first substrate 100.

Figure 3:
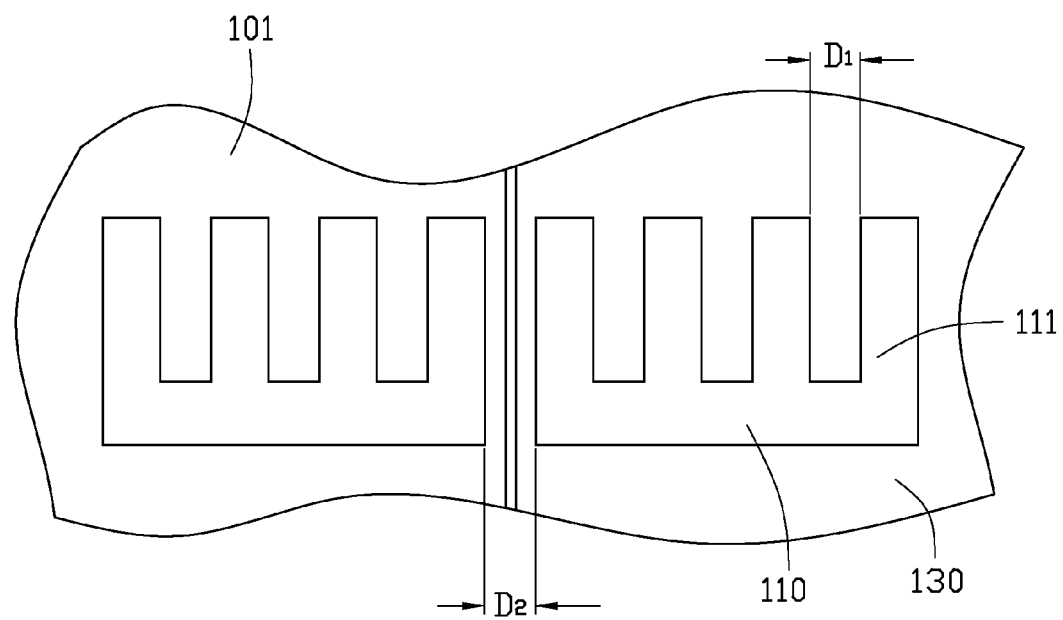
FIG. 3 is an enlarged partial view of the first substrate which includes a plurality of pixel units.

In this embodiment, the first substrate 100 can be a thin film transistor (TFT) array substrate. For example, FIG. 3 illustrates an enlarged partial view of the first substrate 100 which includes a plurality of pixel units 101. Each of the plurality of pixel units 101 includes a pixel electrode 110. Each of the pixel electrodes 110 can be a comb-like structure and include a plurality of sub-pixel electrodes 111. Each two adjacent sub-pixel electrodes 111 can define a first space D1. Each two adjacent pixel electrodes 110 can define a second space D2.

At block 1002, a first alignment layer 140 is formed on the first substrate 100 to cover the plurality of pixel electrodes 110, and a plurality of first grooves 141 having a pre-tilt angle are formed on the first alignment layer 140.

Figure 4:
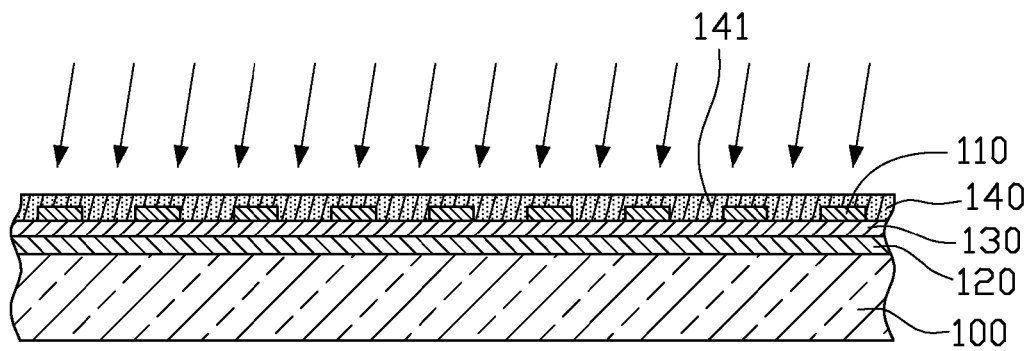
FIG. 4 illustrates a diagrammatic view of a first alignment layer formed on the first substrate to cover the plurality of pixel electrodes.

In one embodiment, the first grooves 141 can be formed by an exposure process performed on the first alignment layer 140 as illustrated in FIG. 4. The first alignment layer 140 can be an alignment film such as a polyimide (PI) film. The first grooves 141 can be arranged along a predetermined orientation. The exposure light used to expose the first alignment layer 140 can be ultraviolet (UV) light with a wavelength less than 400 nanometers (nm). The exposure light is transmitted to the alignment layer 140 along a preset direction forming the first pre-tilt angle (for example, two degrees) with a vertical direction perpendicular to the first substrate 100. Thus, the first grooves 141 of the first alignment layer 140 can be tilted at the first pre-tilt angle relative to the vertical direction after the first alignment layer 140 is exposed by the exposure light.

Figure 5:
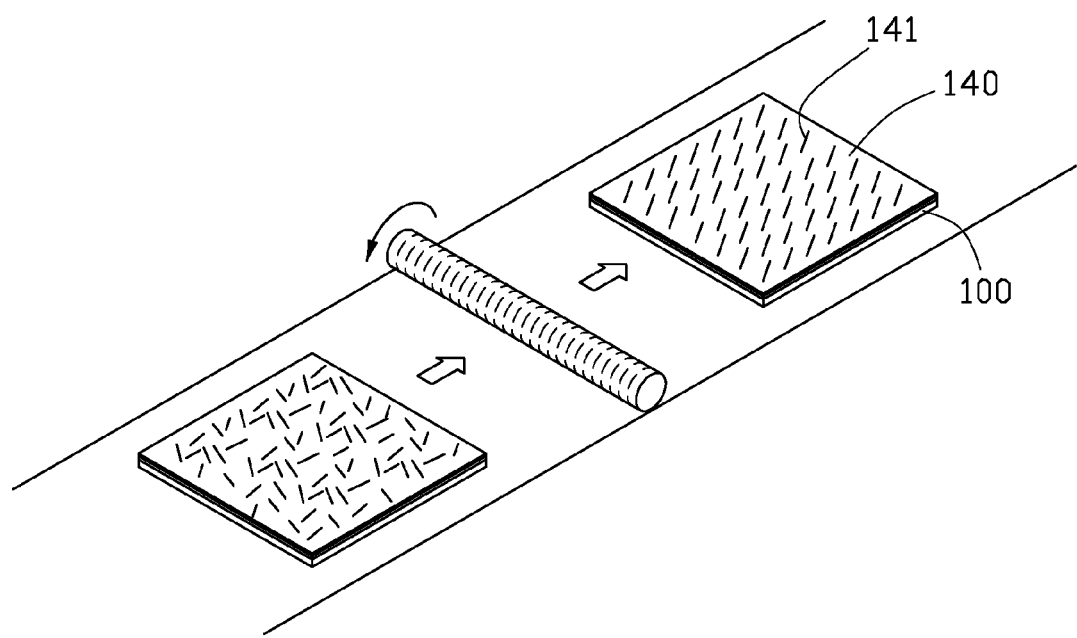
FIG. 5 illustrates a diagrammatic view of a rubbing process to form a plurality of first grooves on the first alignment layer.

In other embodiments, the first grooves 141 can be formed on the first alignment layer 140 by a rubbing process as shown in FIG. 5. For example, the first alignment layer 140 can be rubbed by a roller having rubbing material rolling along a predetermined direction to form the first grooves 141 arranged at the first pre-tilt angle.

At block 1003, a second alignment layer 210 is formed on a second substrate 200, and a plurality of second grooves 211 arranged at the first pre-tilt angle are formed on the second alignment layer 210. In at least one embodiment, the second alignment layer 210 can be an alignment film such as a PI film as well as the first alignment layer 140.

Figure 6:
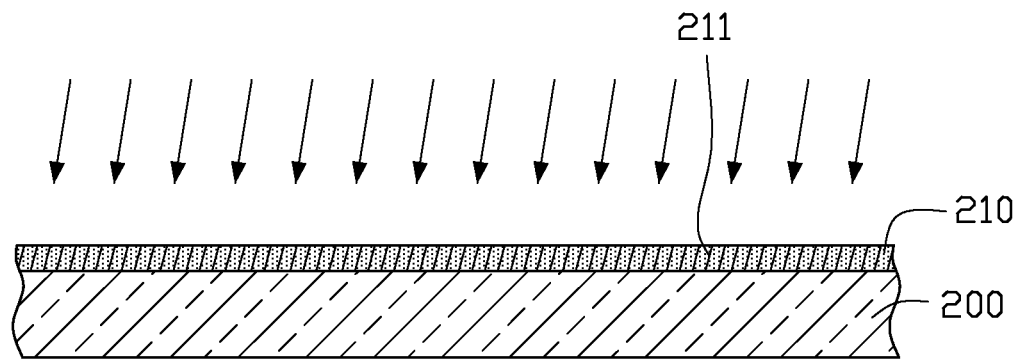
FIG. 6 illustrates a diagrammatic view of a second alignment layer formed on a second substrate.

In one embodiment, the second grooves 211 can be formed by an exposure process performed on the second alignment layer 210 as illustrated in FIG. 6. The second grooves 211 can be arranged along a predetermined orientation as well as the first grooves 141. The exposure light used to expose the second alignment layer 210 can be UV light with a wavelength is less than 400 nm. The exposure light is transmitted to the alignment layer 210 along the preset direction which forms the first pre-tilt angle (for example, two degrees) with a vertical direction perpendicular to the second substrate 200. Thus, the second grooves 211 of the second alignment layer 210 can be tilted to the first pre-tilt angle relative to the vertical direction after the second alignment layer 210 is exposed by the exposure light.

Figure 7:
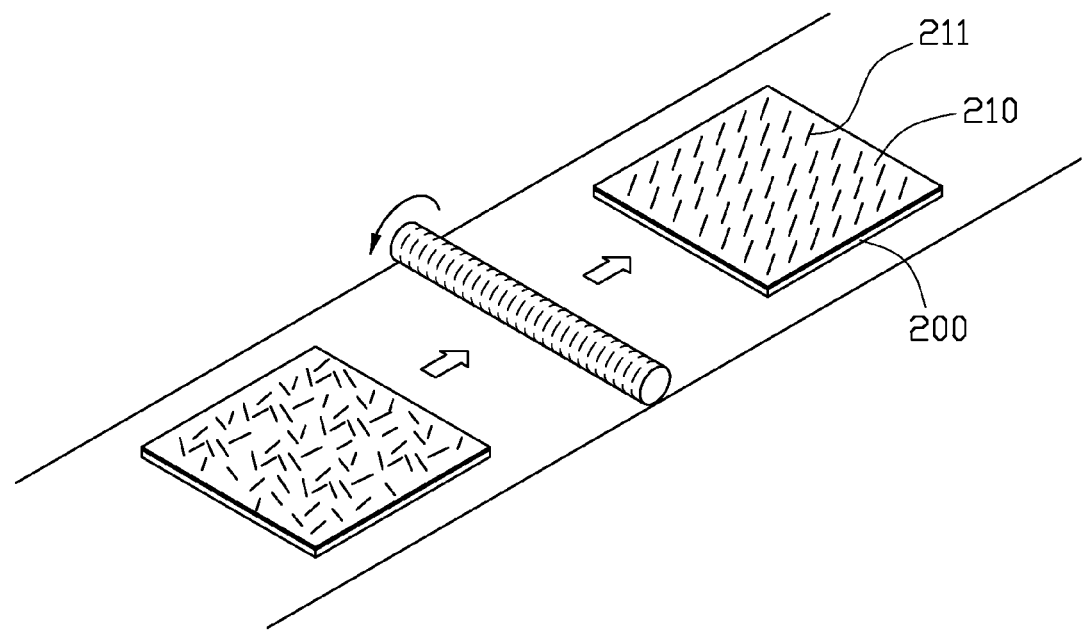
FIG. 7 illustrates a diagrammatic view of a rubbing process to form a plurality of second grooves on the first alignment layer.

In other embodiments, the second grooves 211 can be formed on the second alignment layer 210 by a rubbing process illustrated in FIG. 7. For example, the second alignment layer 210 can be rubbed by a roller having rubbing materials rolling along a predetermined direction to form the second grooves 211 arranged at the first pre-tilt angle.

Figure 8:
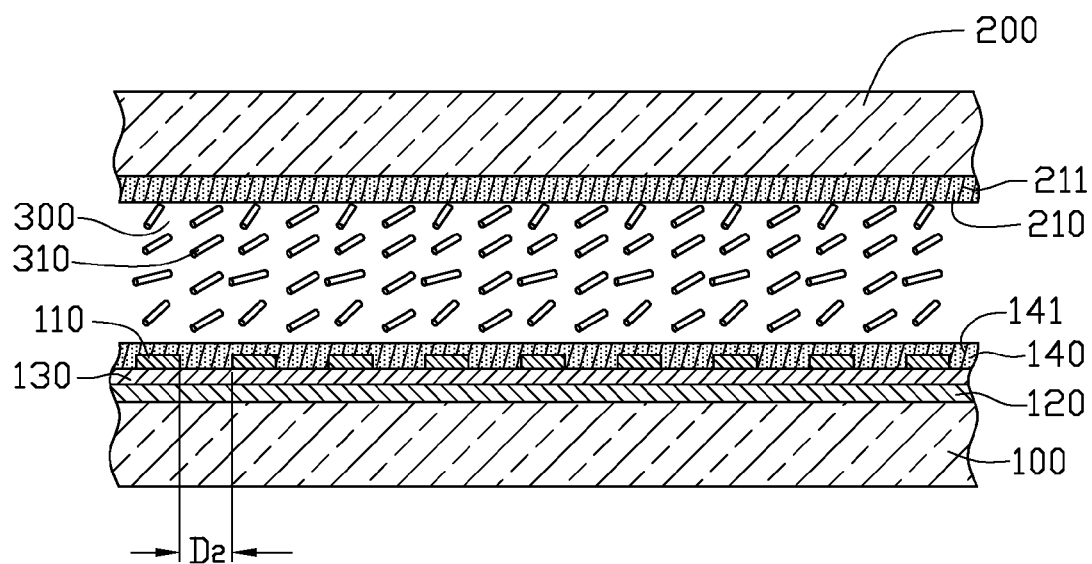
FIG. 8 illustrates a diagrammatic view of a liquid crystal layer formed between the first alignment layer and the second alignment layer.

At block 1004, a liquid crystal layer 300 including a plurality of liquid crystal molecules 310 is formed between the first alignment layer 140 and the second alignment layer 210. Referring to FIG. 8, the plurality of liquid crystal molecules 310 can be injected into a space between the first alignment layer 140 and the second alignment layer 210 to form the liquid crystal layer 300. In other embodiments, a plurality of reactive mesogens (RM) can be doped into the liquid crystal layer 300.

At block 1005, the liquid crystal layer 300 is exposed using a photomask 400 from a side of the second substrate 200 away from the first substrate 100 to obtain the LCD panel 10.

Figure 9:
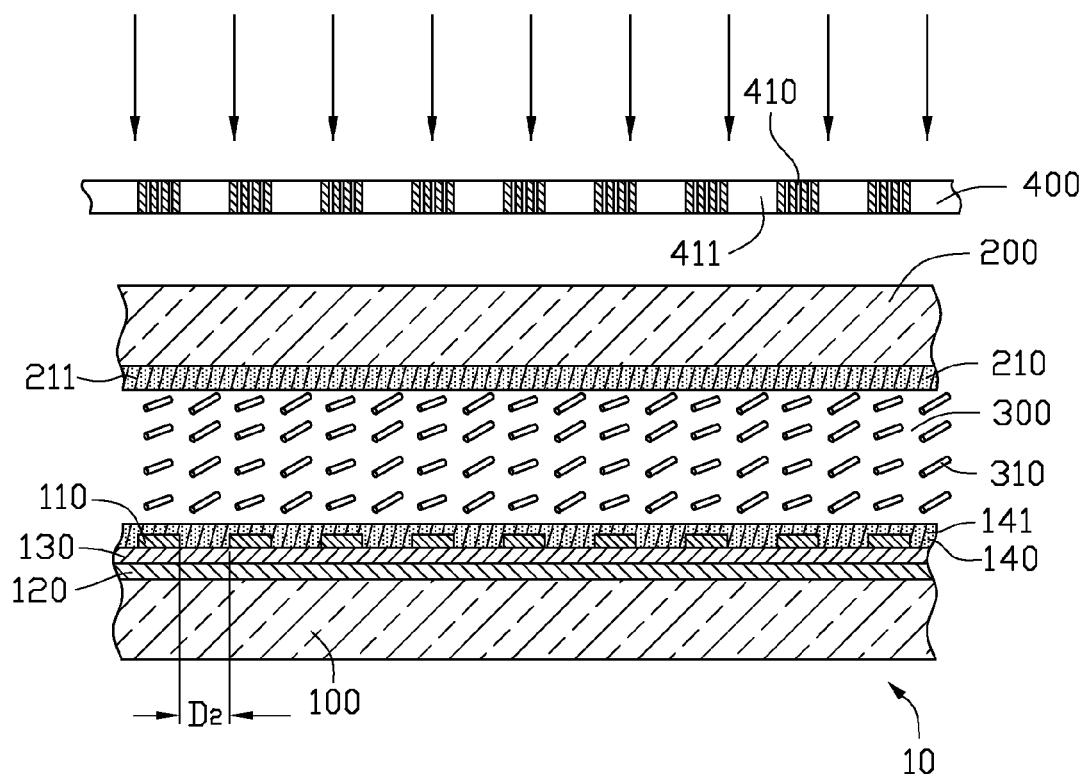
FIG. 9 illustrates a diagrammatic view of the liquid crystal layer is exposed using a photomask from a side of the second substrate away from the first substrate.

As illustrated in FIG. 9, the photomask 400 can define a plurality of first light through portions 410 and a plurality of second light through portions 411. In this embodiment, the first light through portions 410 and the second light through portions 411 refer to different parts of the photomask 400 from which the light can pass therethrough. In at least one embodiment, the first light through portions 410 and the second light through portions 411 can be openings defined on the photomask 400. The first space D1 between each two adjacent sub-pixel electrodes 111 of the pixel electrode 110 is aligned with one of the first light through portions 410 along the vertical direction perpendicular to the first substrate 100. The second space D2 between each two adjacent pixel electrodes 110 is aligned with one of the second light through portions 411. Thus, the liquid crystal molecules 310 are divided into a first portion which is not exposed and a second portion which is exposed. The second portion is corresponding to the first light through portions 410 and the second light through portions 411 and will be arranged at a second pre-tilt angle after being exposed. The first portion is not exposed and will be arranged at the first pre-tilt angle. In this embodiment, the second pre-tilt angle is less than the first pre-tilt angle.

Figure 10:
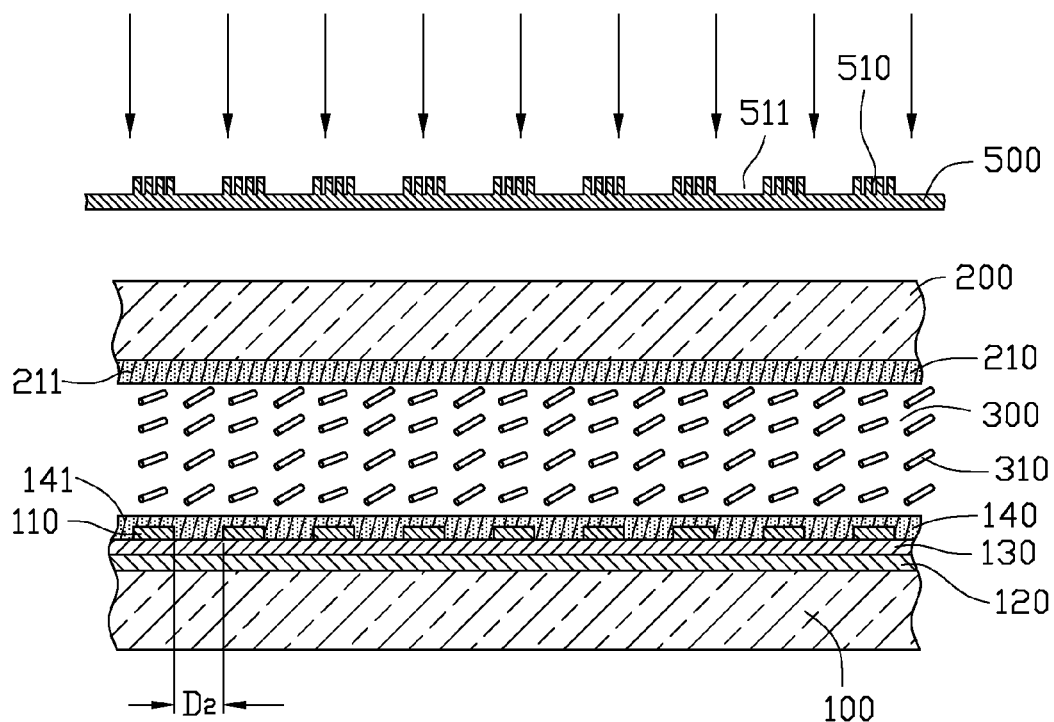
FIG. 10 illustrates a diagrammatic view of a half-tone photomask used to expose the liquid crystal layer.

In other embodiments, the photomask 400 can be a half-tone photomask 500 as illustrated in FIG. 10. The half-tone mask 500 includes a plurality of first light through portions 510 and a plurality of second light through portions 511. In this embodiment, the first light through portions 510 and the second light through portions 511 refer to different parts of the photomask 400 (or half-tone mask 500) from which the light can pass therethrough. The plurality of first light through portions 510 and the plurality of second light through portions 511 are made of translucent materials which allow light to pass. Each of the plurality of first light through portions 510 is aligned with a corresponding first space D1 between two adjacent sub-pixel electrodes 111 of the pixel electrode 110 along the vertical direction perpendicular to the first substrate 100. Each of the plurality of second light through portions 511 is aligned with a corresponding second space D2 between two adjacent pixel electrodes 110. Thus, the liquid crystal molecules 310 in the liquid crystal layer 300 are divided into a first portion which are not exposed by the exposure process and a second portion which are exposed by the exposure process. The second portion is corresponding to the first light through portions 410 and the second light through portions 411 and has a second pre-tilt angle, and the first portion is not exposed and has the first pre-tilt angle. In this embodiment, the second pre-tilt angle is less than the first pre-tilt angle.

As described above, when the LCD panel 10 is applied with a voltage, an extra unexpected vertical electric field may be generated at a position corresponding to each of the first space D1 and the second space D2, the first portion of the liquid crystal molecules 310 arranged at the first pre-tilt angle will be twisted by a first angle. The second portion of the liquid crystal molecules 310 corresponding to the first light through portions 410 and the second light through portions 411 will be twisted by a second angle greater than the first angle. Since the second pre-tilt angle of the second portion is less than the first pre-tilt angle of the first portion, a twisted angle of the first portion and a twisted angle of the second portion can be almost the same by controlling the exposure time of the liquid crystal layer 300. Thus, the light transmission of the LCD panel 100 can be improved.

Figure 11:
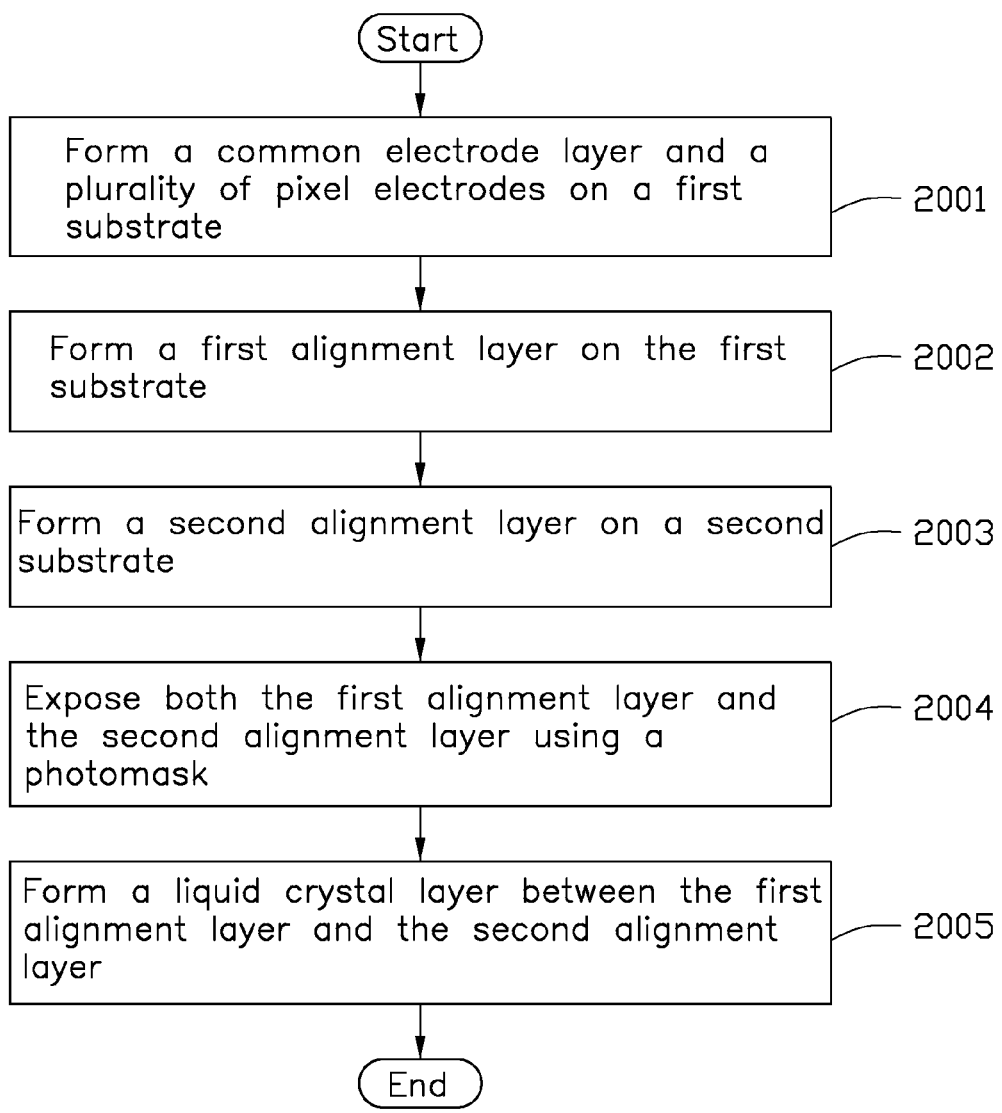
FIG. 11 illustrates a flowchart of a method for manufacturing the LCD panel according to a second embodiment.

FIG. 11 illustrates a flowchart of a method for manufacturing the LCD panel 10 according to a second embodiment. The method is provided by way of example, as there are a variety of ways to carry out the method. Each block shown in FIG. 11 represents one or more processes, methods, or subroutines which are carried out in the example method. Furthermore, the order of blocks is illustrative only and the order of the blocks can change. Additional blocks can be added or fewer blocks may be utilized without departing from the scope of this disclosure. The example method can begin at block 2001.

At block 2001, a common electrode layer 120 and a plurality of pixel electrodes 110 are respectively formed on a first substrate 100. FIG. 2 illustrates the common electrode layer 120 is insulated and is separated from the plurality of pixel electrodes 110 via an insulation layer 130. The common electrode layer 120 is formed on a surface of the first substrate 100. The insulation layer 130 is located between the common electrode layer 120 and the plurality of pixel electrodes 110. The plurality of pixel electrodes 110 can be formed on a surface of the insulation layer 130 away from the first substrate 100 at intervals.

In this embodiment, the first substrate 100 can be a TFT array substrate. For example, FIG. 3 illustrates a partial view of the first substrate 100 which includes a plurality of pixel units 101. Each of the plurality of pixel units 101 includes a pixel electrode 110. Each of the pixel electrodes 110 can be a comb-like structure and include a plurality of sub-pixel electrodes 111. A first space D1 is defined between each two adjacent sub-pixel electrodes 111. A second space D2 is defined between each two adjacent pixel electrodes 110.

At block 2002, a first alignment layer 140 is formed on the first substrate 100 to cover the plurality of pixel electrodes 110, and a plurality of first grooves 141 having a pre-tilt angle are formed on the first alignment layer 140. The first alignment layer 140 can be an alignment film such as a PI film. Similar to the first embodiment, the first grooves 141 can be formed by an exposure process as shown in FIG. 4 or by a rubbing process as shown in FIG. 5.

At block 2003, a second alignment layer 210 is formed on a second substrate 200, and a plurality of second grooves 211 arranged at the first pre-tilt angle are formed on the second alignment layer 210. In at least one embodiment, the second alignment layer 210 can be an alignment film such as a polyimide (PI) film as well as the first alignment layer 140. Similar to the first embodiment, the second grooves 211 can be formed by an exposure process as shown in FIG. 6 or by a rubbing process as shown in FIG. 7.

At block 2004, both the first alignment layer 140 and the second alignment layer 210 are exposed using a photomask 600.

Figure 12:
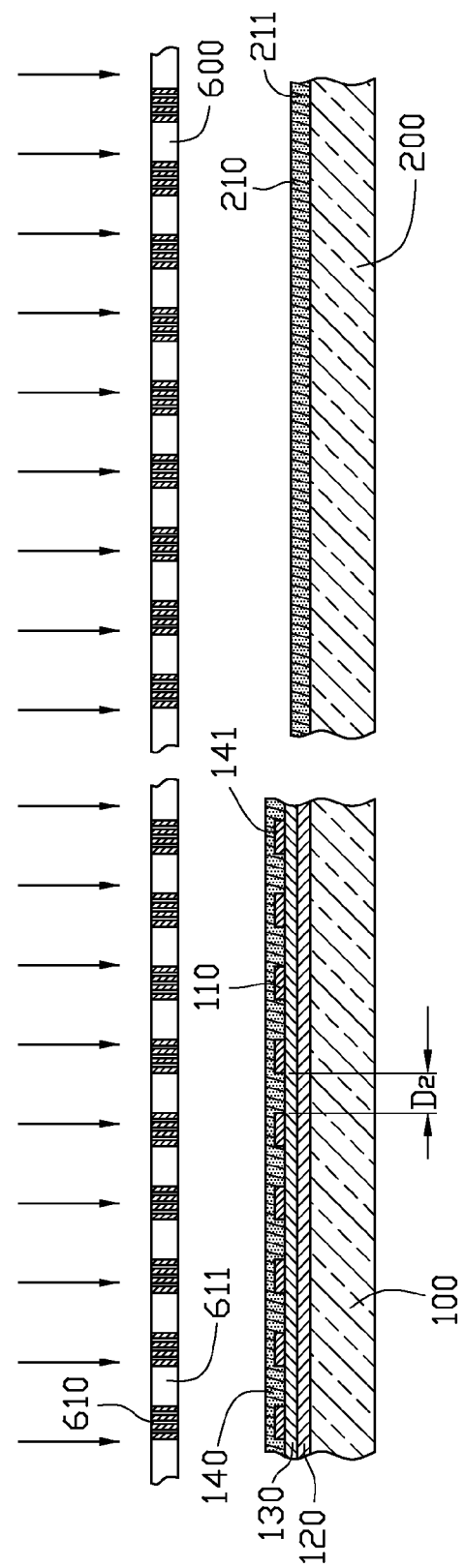
FIG. 12 illustrates a diagrammatic view of the first alignment layer and the second alignment layer are exposed using a photomask in the method according to the second embodiment.

FIG. 12 illustrates the photomask 600 includes a plurality of first light through portions 610 and a plurality of second light through portions 611. The first space D1 between each two adjacent sub-pixel electrodes 111 of the pixel electrode 110 is aligned with a corresponding first light through portion 610 along the vertical direction perpendicular to the first substrate 100. The second space D2 between each two adjacent pixel electrodes 110 is aligned with a corresponding second light through portion 611. Thus, each of the first alignment layer 140 and the second alignment layer 210 is divided into a first portion which is not exposed and a second portion which is exposed. The second portion is corresponding to the first light through portions 610 and the second light through portions 611. A portion of the first grooves 141 corresponding to the second portion of the first alignment layer 140 will be arranged at a second pre-tilt angle, and the other portion of the first grooves 141 corresponding to the first portion of the first alignment layer 140 will be arranged at a first pre-tilt angle. Accordingly, a portion of the second grooves 211 corresponding to the second portion of the second alignment layer 210 will be arranged at the second pre-tilt angle, and the other portion of the second grooves 211 corresponding to the first portion of the second alignment layer 210 will be arranged at the first pre-tilt angle. In this embodiment, the second pre-tilt angle is less than the first pre-tilt angle because a surface tension of the second portion of both the first alignment layer 140 and the second alignment layer 210 is changed by the exposure process.

Figure 13:
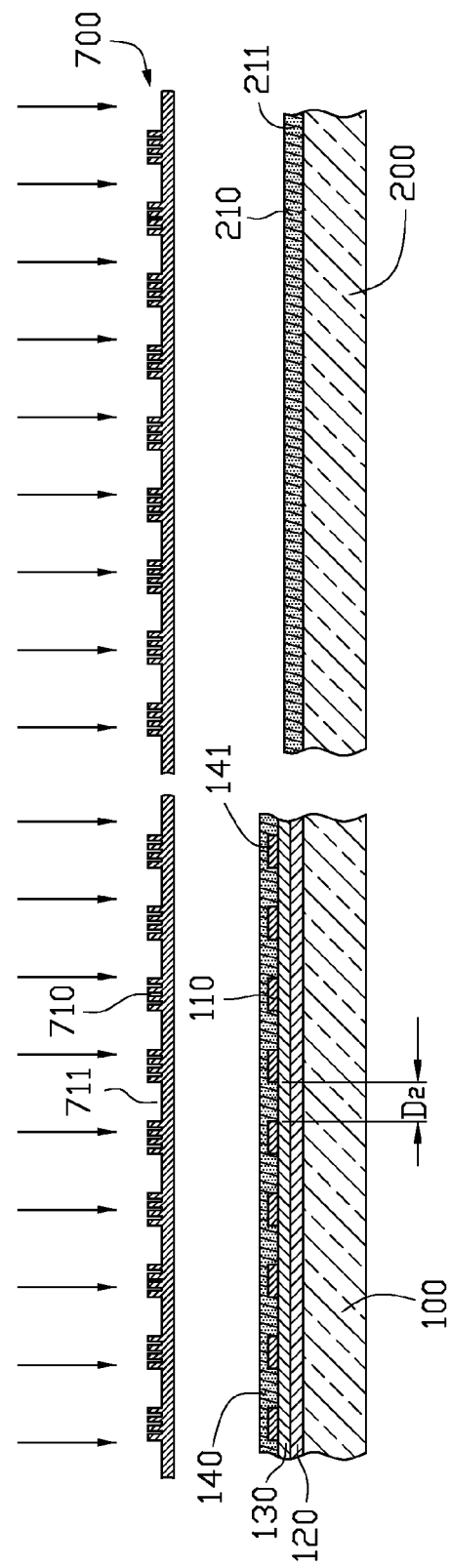
FIG. 13 illustrates a diagrammatic view of a half-tone photomask used to expose the first alignment layer and the second alignment layer.

In other embodiments, the photomask 600 can be a half-tone photomask 700 as illustrated in FIG. 13. The half-tone mask 700 includes a plurality of first light through portions 710 and a plurality of second light through portions 711. The plurality of first light through portions 710 and the plurality of second light through portions 711 are made of translucent materials which allow light to pass therethrough. The first space D1 between each two adjacent sub-pixel electrodes 111 of the pixel electrode 110 is aligned with a corresponding first light through portion 710 along the vertical direction perpendicular to the first substrate 100. The second space D2 between each two adjacent pixel electrodes 110 is aligned with a corresponding second light through portion 711.

Figure 14:
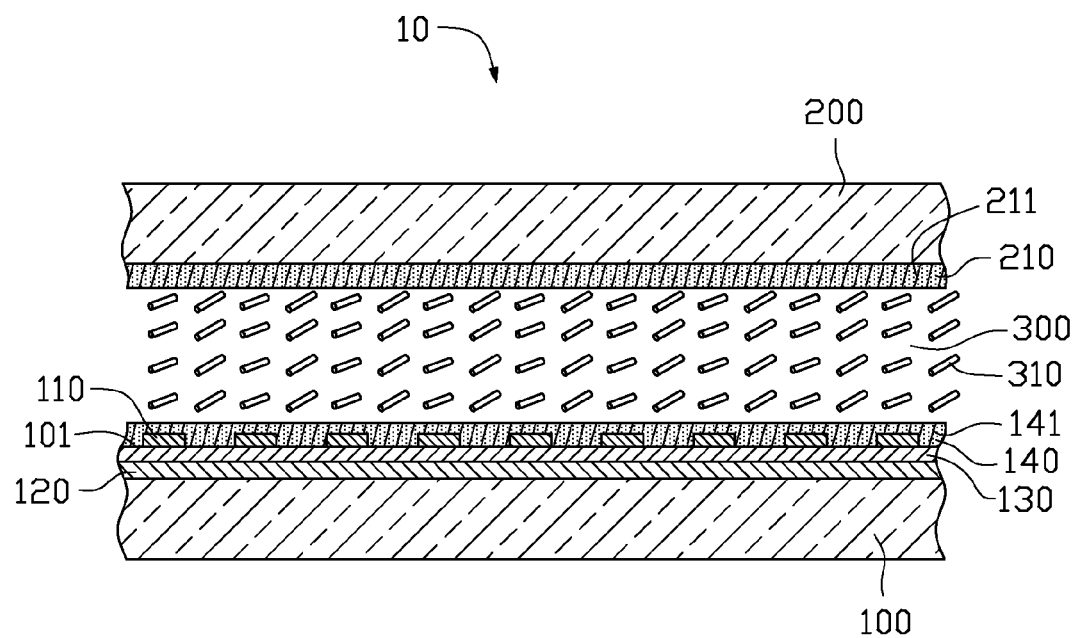
FIG. 14 illustrates a diagrammatic view of a liquid crystal layer including a plurality of liquid crystal molecules formed between the first alignment layer and the second alignment layer of FIG. 12 or FIG. 13.

At block 2005, a liquid crystal layer 300 including a plurality of liquid crystal molecules 310 is formed between the first alignment layer 140 and the second alignment layer 210, to form the LCD panel 10. Referring to FIG. 14, in at least one embodiment, the plurality of liquid crystal molecules 310 can be injected into a space between the first alignment layer 140 and the second alignment layer 210 to form the liquid crystal layer 300. In other embodiments, a plurality of reactive mesogens (RM) can be doped into the liquid crystal layer 300.

In at least one embodiment, the liquid crystal molecules 310 in the liquid crystal layer 300 are divided into a first portion corresponding to the second portion of the first alignment layer 140 (or corresponding to the second portion of the second alignment layer 210) and a second portion corresponding to the first portion of the first alignment layer 140 (or corresponding to the first portion of the second alignment layer 210). Thus, the first portion of the liquid crystal molecules 310 are arranged at the first pre-tilt angle and the second portion of the liquid crystal molecules 310 are arranged at the second pre-tilt angle. In this embodiment, the second pre-tilt angle is less than the first pre-tilt angle.

When a voltage is applied to the LCD panel 10, an extra unexpected vertical electric field may be generated at a position corresponding to each of the first space D1 and the second space D2, the first portion of the liquid crystal molecules 310 arranged at the first pre-tilt angle will be twisted by a first angle. The second portion of the liquid crystal molecules 310 corresponding to the first light through portions 410 and the second light through portions 411 will be twisted by a second angle that is greater than the first angle. Since the second pre-tilt angle of the second portion is less than the first pre-tilt angle of the first portion, a twisted angle of the first portion of the liquid crystal molecules 310 and a twisted angle of the second portion of the liquid crystal molecules 310 can be almost the same. Thus, the light transmission of the LCD panel 100 can be improved.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method for manufacturing a liquid crystal display panel comprising:
    forming a plurality of pixel electrodes on a first substrate, each of the plurality of pixel electrodes comprising a plurality of sub-pixel electrodes, wherein each of two adjacent one of the sub-pixel electrodes define a first space therebetween;
    forming a first alignment layer on the first substrate to cover the plurality of pixel electrodes;
    forming a plurality of first grooves arranged at a pre-tilt angle on the first alignment layer;
    forming a second alignment layer on a second substrate;
    forming a plurality of second grooves arranged at the first pre-tilt angle on the second alignment layer;
    forming a liquid crystal layer comprising a plurality of liquid crystal molecules between the first alignment layer and the second alignment layer; and
    exposing, from a side of the second substrate away from the first substrate, the liquid crystal layer using a photomask to arrange a portion of the liquid crystal molecules at a first pre-tilt angle and the other portion of the liquid crystal molecules at a second pre-tilt angle that is less than the first pre-tilt angle,
    wherein the photomask comprises a plurality of first light through portions, and the first space between each of the two adjacent one of the sub-pixel electrodes is aligned with one of the plurality of first light through portions.

2. The method according to claim 1, wherein each of two adjacent one of the pixel electrodes define a second space therebetween, the photomask further comprises a plurality of second light through portions, and the second space between each of the two adjacent one of the pixel electrodes is aligned with one of the plurality of second light through portions.

3. The method according to claim 2, wherein the other portion of the liquid crystal molecules arranged at the second pre-tilt angle are corresponding to the first light through portions and the second light through portions.

4. The method according to claim 2, wherein the first light through portions and the second light through portions are openings defined on the photomask to allow light to pass therethrough.

5. The method according to claim 2, wherein the photomask is a half tone photomask, and the first light through portions and the second light through portions are made of translucent materials to allow light to pass therethrough.

6. The method according to claim 1, wherein the first grooves are formed on the first alignment layer by exposing the first alignment layer using exposure light transmitted from a preset direction.

7. The method according to claim 1, wherein the first grooves are formed on the first alignment layer by a rubbing process.

8. The method according to claim 1, wherein the second grooves are formed on the second alignment layer by exposing the first alignment layer using exposure light transmitting from a preset direction.

9. The method according to claim 1, wherein the second grooves are formed on the second alignment layer by a rubbing process.

10. A method for manufacturing a liquid crystal display panel comprising:
    forming a plurality of pixel electrodes on a first substrate, each of the plurality of pixel electrodes comprising a plurality of sub-pixel electrodes, wherein each of two adjacent one of the sub-pixel electrodes define a first space therebetween;
    forming a first alignment layer on the first substrate to cover the plurality of pixel electrodes;
    forming a plurality of first grooves having a pre-tilt angle on the first alignment layer;
    forming a second alignment layer on a second substrate and forming a plurality of second grooves arranged at the first pre-tilt angle on the second alignment layer;
    exposing the first alignment layer and the second alignment layer using a photomask; and
    forming a liquid crystal layer comprising a plurality of liquid crystal molecules between the first alignment layer and the second alignment layer;
    wherein the photomask comprises a plurality of first light through portions, and the first space between each of the two adjacent one of the sub-pixel electrodes is aligned with one of the plurality of first light through portions;
    wherein a portion of the liquid crystal molecules are arranged at a first pre-tilt angle and the other portion of the liquid crystal molecules are arranged at a second pre-tilt angle that is less than the first pre-tilt angle.

11. The method according to claim 10, wherein each of two adjacent one of the pixel electrodes define a second space therebetween, the photomask further comprises a plurality of second light through portions, and the second space between each of the two adjacent one of the pixel electrodes is aligned with one of the plurality of second light through portions.

12. The method according to claim 11, wherein the other portion of the liquid crystal molecules arranged at the second pre-tilt angle are corresponding to the first light through portions and the second light through portions.

13. The method according to claim 11, wherein the first light through portions and the second light through portions are openings defined on the photomask to allow light to pass therethrough.

14. The method according to claim 11, wherein the photomask is a half tone photomask, and the first light through portions and the second light through portions are made of translucent materials to allow light to pass therethrough.

15. The method according to claim 11, wherein each of the first alignment layer and the second alignment layer comprises a first portion which is not exposed and a second portion which is exposed; a portion of the first grooves corresponding to the first portion of the first alignment layer are arranged at the first pre-tilt angle, and the other portion of the first grooves corresponding to the second portion of the first alignment layer are arranged at the second pre-tilt angle; a portion of the second grooves corresponding to the first portion of the second alignment layer are arranged at the first pre-tilt angle, and the other portion of the second grooves corresponding to the second portion of the second alignment layer are arranged the second pre-tilt angle.

16. The method according to claim 10, wherein the first grooves are formed on the first alignment layer by exposing the first alignment layer using exposure light from a preset direction.

17. The method according to claim 10, wherein the first grooves are formed on the first alignment layer by a rubbing process.

18. The method according to claim 10, wherein the second grooves are formed on the second alignment layer by exposing the first alignment layer using exposure light from a preset direction.

19. The method according to claim 10, wherein the second grooves are formed on the second alignment layer by a rubbing process.

20. A liquid crystal display panel comprising:

a first substrate;

a plurality of pixel electrodes formed on the first substrate, wherein each of the plurality of pixel electrodes comprises a plurality of sub-pixel electrodes, each of two adjacent one of the sub-pixel electrodes define a first space therebetween; and each of two adjacent one of the pixel electrodes define a second space therebetween;

a second substrate opposite to the first substrate; and a liquid crystal layer comprising a plurality of liquid crystal molecules, wherein a portion of the liquid crystal molecules corresponding to the first space and the second space are arranged at a first pre-tilt angle and the other portion of the liquid crystal molecules are arranged at a second pre-tilt angle that is less than the first pre-tilt angle.

* * * * *